United States Patent
Wei

(10) Patent No.: US 6,775,653 B1
(45) Date of Patent: Aug. 10, 2004

(54) METHOD AND APPARATUS FOR PERFORMING DOUBLE-TALK DETECTION WITH AN ADAPTIVE DECISION THRESHOLD

(75) Inventor: Xiong Guan Wei, Shanghai (CN)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/537,763

(22) Filed: Mar. 30, 2000

(30) Foreign Application Priority Data

Mar. 27, 2000 (CN) ........................................ 00120023 A

(51) Int. Cl.[7] ............................................. G10L 17/00

(52) U.S. Cl. .................. 704/248; 704/246; 379/406.14; 379/406.01

(58) Field of Search ...................... 704/248; 379/406.14, 379/406.01, 406.02, 406.09, 406.12

(56) References Cited

U.S. PATENT DOCUMENTS

| | | | | |
|---|---|---|---|---|
| 4,897,832 A | * | 1/1990 | Suzuki et al. ............... | 370/287 |
| 5,598,468 A | * | 1/1997 | Ammicht et al. ........... | 370/290 |
| 5,602,913 A | * | 2/1997 | Lee et al. ................. | 379/406.06 |
| 5,613,037 A | * | 3/1997 | Sukkar ....................... | 704/251 |
| 5,619,566 A | * | 4/1997 | Fogel ..................... | 379/406.07 |
| 5,663,955 A | * | 9/1997 | Iyengar ....................... | 370/291 |
| 5,664,011 A | * | 9/1997 | Crochiere et al. ..... | 379/406.08 |
| 5,764,753 A | * | 6/1998 | McCaslin et al. ...... | 379/406.07 |
| 6,192,126 B1 | * | 2/2001 | Koski ..................... | 379/406.14 |
| 6,385,176 B1 | * | 5/2002 | Iyengar et al. ............. | 370/286 |
| 6,611,594 B1 | * | 8/2003 | Benesty et al. ........ | 379/406.09 |

OTHER PUBLICATIONS

Cho, "An Objective Technique for evaluating Doubletalk Detectors. . . . .Echo Cancelers", IEEE Transaction for Speech and Audio Processing , vol. 7 #6, Nov. 1999.*

D.L. Duttweiler, "A Twelve–Channel Digital Echo Canceller," IEEE Trans. Commun., vol. COM–26, pp. 647–653, 1978.

J. Benesty et al., "A New Class of Double–Talk Detectors Based on Cross–Correlation," IEEE Trans. Signal Processing, vol. 46, No. 6, Jun. 1998.

T. Gansler et al., "A Double–Talk Detector Based on Coherence,"IEEE Trans. Commun., vol. 44, pp. 1421–1427, Nov. 1996.

K. Ochiai et al., "Echo Canceller with Two Echo Path Models," IEEE Trans. Commun., vol. COM–25, pp. 589–595, Jun. 1977.

C. Carlemalm et al., "On Detection of Double–Talk and Changes in the Echo Path Using a Markov Modulated Channel Model," Proc. Intl. Conf. ASSP, Munich, Germany, , vol. V, pp. 3869–3872, Apr. 20–24, 1997.

I. Pitas, "Fast algorithms for running ordering and max/min calculation," IEEE Trans. Circuits Syst., vol. 36, pp. 795–804, Jun. 1989.

\* cited by examiner

Primary Examiner—Doris H. To
Assistant Examiner—Michael N. Opsasnick

(57) ABSTRACT

A double-talk detector (DTD) method of performing double-talk detection, an echo canceller, and a method of performing echo cancellation is used with an echo canceller (EC) to sense when an echo is corrupted by near-end speech (NES). The double-talk detector inhibits the adaptation of a synthesizing filter when NES is present, in order to avoid divergence of the adaptive algorithm. Due to the time varying properties of the echo path and the signal levels, a suitable decision threshold ensures the accuracy of the DTD. The double-talk detector utilizes an adaptive decision threshold which is capable of tracking variations in the echo path and signal/noise levels during a call.

32 Claims, 7 Drawing Sheets

3(a)

3(b)

METHOD AND APPARATUS FOR PERFORMING DOUBLE-TALK DETECTION WITH AN ADAPTIVE DECISION THRESHOLD

FIELD OF THE INVENTION

The present invention is directed to a method and apparatus for performing double-talk detection, and more particularly, to a method and apparatus for performing double-talk detection with adaptive decision thresholding.

BACKGROUND ART

Communications usually include at least two parties and associated hardware. With respect to one set of hardware, the speech from the party co-located with the hardware is termed near-end speech and the speech from the other party is termed far-end speech. Most conventional echo cancellers (which may be used with both sets of hardware) use an adaptive filter to estimate echo path and synthesize an estimated echo signal that is subtracted from a signal Sin, in order to reduce the near-end echo. FIG. 1 illustrates a conventional echo canceller 10, including an adaptive FIR filter 12, which performs a normalized least mean square (NLMS) algorithm, a double-talk detector 14, which performs speech detection and comparison and a hybrid 16. In order to correctly estimate the actual echo path from the input (Rout of the echo canceller 10, usually the same as the echo canceller 10 Rin signal) and output (Sin of the echo canceller 10) signals, the output of the echo path must originate solely from the input signal. The adaptive FIR filter 12 is easily modified to estimate the echo path if the near-end and the far-end parties speak one at a time. When both parties speak simultaneously, this situation is termed "double-talk". During double-talk, the output signal contains not only the echo of the input signal, but the near-end speech signal as well.

When near-end speech is present, the adaptation of the filter 12 should be inhibited, otherwise an erroneous estimate of the echo path is obtained, which results in poor echo cancellation. The role of the double-talk detector 14 is to sense when the echo is corrupted by near-end speech and then inhibit the adaptation of the filter 12. Due to the divergent problems during double-talk situations, the double-talk detector 104 has a large impact on the overall performance of the echo canceller 10.

Numerous attempts have been made to perform double-talk detection which exploit the spectrum characteristic or the power level information derived from the near-end and far-end signals. For example, the conventional Geigel algorithm as described in D. L. Duttweiler, "A Twelve-Channel Digital Echo Canceller," IEEE Trans. Commun., Vol. COM-26, pp. 647–653, 1978, which follows the power comparison concept, makes the basic assumption that echo has a much lower power level than the far-end speech signal. Therefore, if the near-end signal power is lower than the far-end speech by a certain threshold (usually 6 dB), the near-end signal is considered echo and the echo canceller tries to cancel it. Otherwise, double-talk is declared and adaptation is prohibited. The Geigel algorithm is very efficient (simple and low computation cost) and fairly effective (adequate for most applications).

However, the basic assumption of the Geigel algorithm is not true in the following cases:

(1) the near-end speaker is speaking with lower volume or excessive loss is introduced in the near-end analog circuits; and (2) a large volume echo may occur in a mobile or hands-free phone or in some hybrids with severe leakage.

In these cases, the echo canceller may mistake the lower near-end speech as echo and try to cancel it, or mistake the strong echo as the near-end speech and try to keep it.

Another class of double-talk algorithms is the cross-correlation or coherence-based algorithms (denoted here as "CORR-algorithms"), as described in, for example, J. Benesty et al., "A New Class of Double-Talk Detectors Based on Cross-Correlation," IEEE Trans. Signal Processing, Vol. 46, No. 6, June 1998 and T. Gansler et al., "A Double-Talk Detector Based on Coherence," IEEE Trans. Commun., Vol. 44, pp. 1421–1427, November 1996, which are based on the assumption that speech signals from different parties are independent through the call, and then use a cross-correlation coefficient vector between the Rout and Sin signals for double-talk detection. Since echoes can usually be approximated as an attenuated and delayed version of their original signals, strong correlation between echoes and their originates should exist. This makes the cross-correlation coefficient vector an efficient measurement for double-talk detection. Compared to the Geigel Algorithm, the CORR-algorithms introduce an extra decision delay of at least one speech frame (usually several hundred samples) in order to reliably estimate the cross-correlation functions. As a result of the lag decision, adaptation also must be delayed in order to avoid severely canceling the initial part of the break-in near-end speech. The CORR-algorithms also are much more computational complex, especially when estimating a coherence function in the spectrum domain.

Other attempts to resolve the double-talk problem can be found in K. Ochiai et al., "Echo Canceller with Two Echo Path Models," IEEE Trans. Commun., Vol. COM-25, pp. 589–595, June 1977, which uses an echo canceller with two echo path models, or in C. Carlemalm et al., "On Detection of Double-Talk and Changes in the Echo Path Using a Markov Modulated Channel Model," Proc. Intl. Conf. ASSP, Munich, Germany, Apr. 20–24, 1997, Vol. V, pp. 3869–3872, which uses a Markov modulated channel model.

Each of the above-described detection techniques have at least one common feature; namely a suitable precision threshold is critical, due to the time varying properties of the speech levels, the background noise, and the attenuation of the echo path.

This suggests that a fixed decision threshold is not appropriate and should be replaced by an adaptive decision threshold which is capable of continuously tracking variations during the calls. Furthermore, the parameter estimation and double-talk detection algorithms must be fast in order to prevent the synthesizing filter in the echo canceller from diverging.

SUMMARY OF THE INVENTION

The present invention solves the problems with conventional double-talk detectors and echo cancellers, by providing a double-talk detector and a method of performing double-talk detection, as well as an echo canceller and a method of performing echo cancellation, which utilizes an adaptive threshold. The adaptive threshold is capable of continuously tracking variations during a telephone call, and permits the double-talk detector, echo canceller, and methods of the present application to adjust to the time varying properties of speech levels, background noise and/or the attenuation of the echo path.

In another preferred embodiment, the present invention permits the use of two or more, complementary double-talk detection algorithms. For example, one of the double-talk detection algorithms could be a detection algorithm, such as the Geigel algorithm, which is simple and has low computational cost, and is fairly effective, and the other could be a cross-correlation or coherence-based algorithm, which may be more accurate, but also more computationally complex.

In another embodiment of the present invention, the double-talk detector, echo canceller, and methods of the present application, include processing elements which are frame-based, sample-based, or a combination of both.

DETAILED DESCRIPTION OF THE PREFERRED EMBODIMENT

Figure 1:
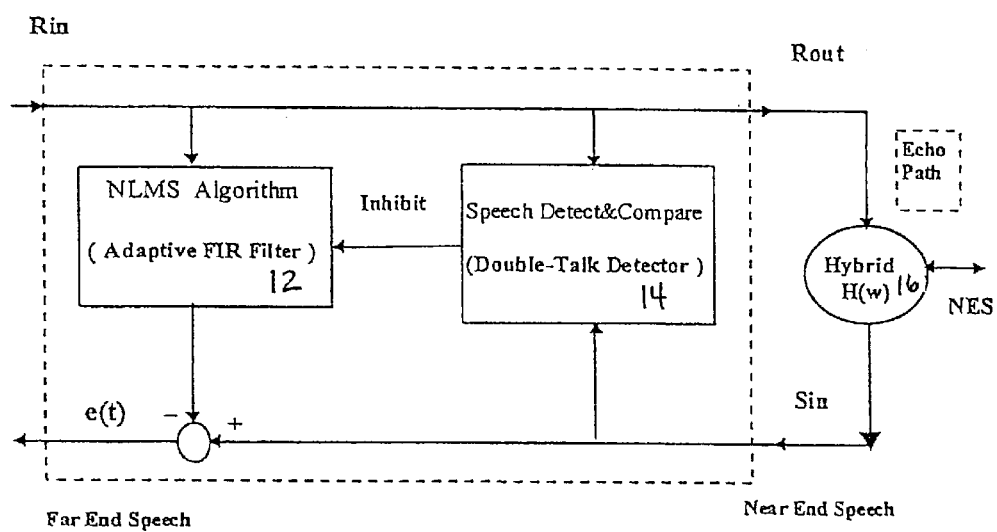
FIG. 1 illustrates a conventional echo canceller.
Figure 2:
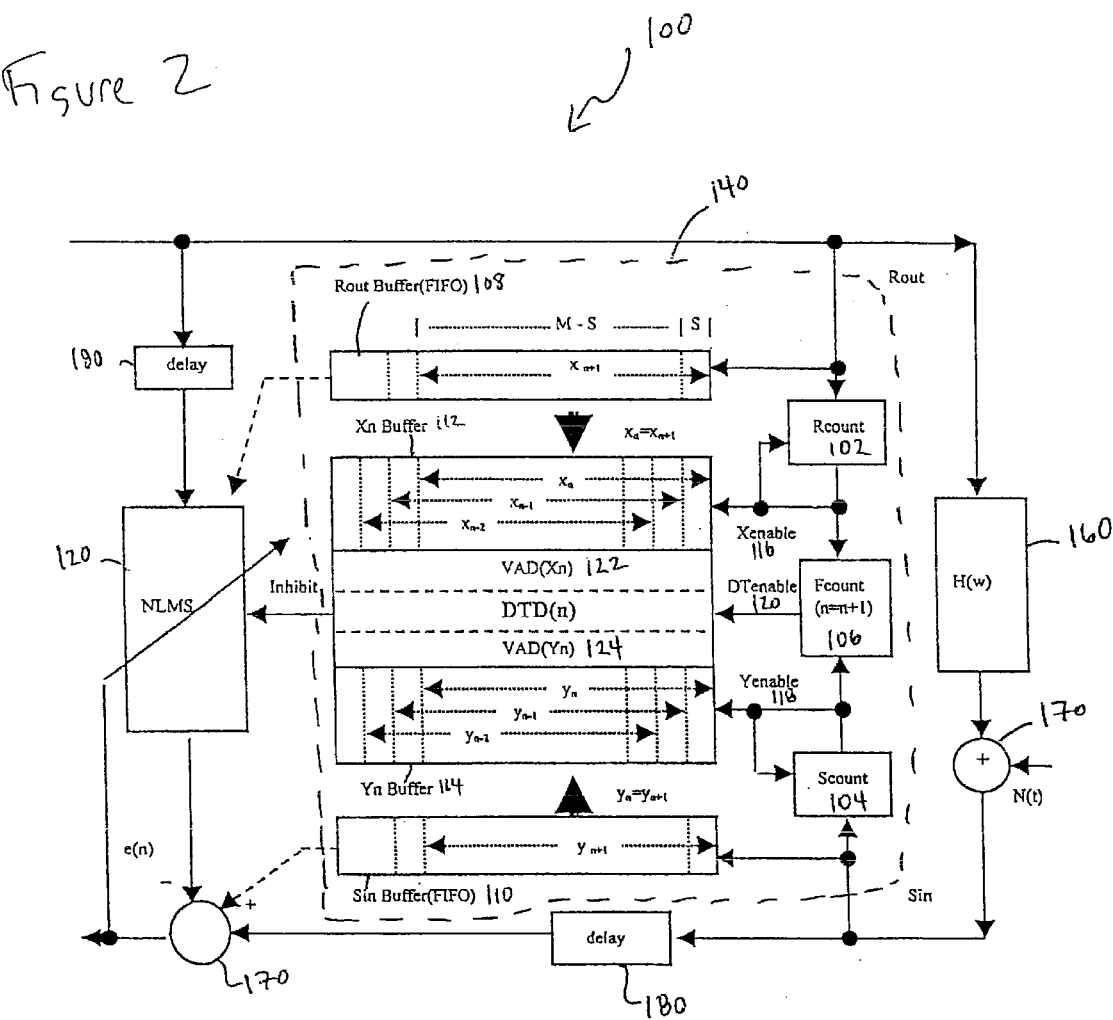
FIG. 2 illustrates an echo canceller in one exemplary embodiment of the present invention.

FIG. 2 illustrates a block diagram of an echo canceller 100 including a double-talk detector in one embodiment of the present invention. The echo canceller 100 includes an element 120 for implementing the NLMS algorithm, the double-talk detector 140, a hybrid 160, summers 170, and delays 180. The double-talk detector 140 further includes two sample counters Rcount 102 and Scount 104, a frame counter Fcount 106, two data input buffers Rout-in Buffer 108 and Sin Buffer 110 (both of which are first-in, first-out), and two double-talk calculation buffers Xn-Buffer 112 and Yn-Buffer 114 that are used to store and segment the input data streams into overlapping frames. Rcount 102 and Scount 104 are used to count the Rout and Sin data samples, respectively. When S samples are received, Rcount 102 (or Scount 104) sends out an enabling signal Xenable 116 (or Yenable 118). The Xenable 116 (or Yenable 118) permits the double-talk detector to perform update enabling, i.e., enable the Xn Buffer 112 (or Yn Buffer 114), left-shifting and right-padding with the S newest coming samples stored in the Rout Buffer 108 (or Sin Buffer 110; clearing of the sample counters, i.e., the sample counters Rcount 102 (Scount 104) are cleared and then restarted after receiving S samples. Xenable 116 (or Yenable 108) also serve as the clock signal for increasing the frame counter.

On a frame-by-frame basis, the data-update procedure in the Xn Buffer 112 or Yn Buffer 114 can be viewed as the following steps:

$x_{n-r} = x_{n-r+1}, \ldots, x_{n-2} = x_{n-1}, x_{n-1} = x_n, x_n = x_{n+1};$ $y_{n-r} = y_{n-r+1}, \ldots, y_{n-2} = y_{n-1}, y_{n-1} = y_n, y_n = y_{n+1};$ where n=n+1, (the frame counter points to the next frame after data update finished).

After the update procedure is finished, a voice activity detector 122, 124 and a double-talk detector algorithm are initiated by a DTenable signal 120, and the double-talk detector 140 results are used to control (inhibit if double-talking) NLMS adaptation in element 120 for the newest S samples in the same frame. Due to overlap in adjacent frames, for each frame, only the latest S samples are used for the NLMS adaptation and error signal calculation.

The Xn Buffer 112 and Yn Buffer 114 are updated once every S samples are received, and the double-talk detection calculations are initiated every S samples on a frame-by-frame basis, if $x_n(i)$=Rout(n.S+i−M) is the n-th frame of the receive-out signal and $y_n(i)$=Sin(n.S+i−M) is the send-in signal sequence that returns from the near-end (the echo path side), where S is the shifting step size between successive frames, and M is the frame length and is usually a multiple of S, i=1, 2, ..., M. The cross-correlation vectors Rxy(n,k), k=0, 1, 2, ..., M−1, the signal energies Ex(n), Ey(n), and the maximum $|R_{xy}(k)|$ value in the n-th frame $\Phi_{xy}(n)$, can be calculated as (for simplicity, the frame index n in Rxy has been omitted). Note that $x_n(i-S)=x_{n-1}(i)$, $y_n(i-S)=y_{n-1}(i)$):

$$Rxy(k) = \sum_{i=1}^{M-k} x_n(i) \cdot y_n(i+k) \quad (1)$$

$$Ex(n) = Rx(0) = \sum_{i=1}^{M} x_n^2(i) \quad (2)$$

$$Ey(n) = Ry(0) = \sum_{i=1}^{M} y_n^2(i) \quad (3)$$

$$\Phi_{xy}(n) = \max_{0 \leq k \leq M-1} |R_{xy}(k)| \quad (4)$$

The square of the normalized cross-correlation coefficients Cxy(n) for the n-th frame can also be defined and calculated as:

$$C_{xy}(n) = \frac{\max_{0 \leq k \leq M-1} R_{xy}^2(k)}{E_x(n) \cdot E_y(n)} = \frac{\Phi_{xy}^2(n)}{E_x(n) \cdot E_y(n)} \leq 1 \quad (5)$$

Since $\sum_{i=1}^{M-k} x_n^2(i) \leq \sum_{i=1}^{M} x_n^2(i) = E_x(n),$ $\sum_{i=1}^{M-k} y_n^2(i+k) = \sum_{i=k+1}^{M} y_n^2(i) \leq \sum_{i=1}^{M} y_n^2(i) = E_x(n), R_{xy}^2(k) =$ $\left[\sum_{i=1}^{M-k} x_n(i) \cdot y_n(i+k)\right]^2 \leq \left[\sum_{i=1}^{M-k} x_n^2(i)\right]\left[\sum_{i=1}^{M-k} y_n^2(i+k)\right] \leq E_x(n) \cdot E_y(n);$ Therefore Cxy(n)≦1, which is the right side of equation (5).

The present invention is based upon the following observations:

1) Signals from two parties are mutually independent throughout a call, and are both independent from the background noise.

2) A transfer function H(w) of the echo path or hybrid 106 commonly has a nearly flat amplitude response and linear phase response in the voice band (about 300 Hz~3400 Hz), as illustrated in FIGS. 3(a) and (b), i.e., for all voice band signals:

$H(w) \approx h_0 \cdot e^{jwn_0} \quad (6)$

Under these conditions, the echo can be approximated by an impairment and delay version of its original signals. This also means that, the echo has strong correlation with the originate signal and their cross-correlation function will obtain peak value at a time delay of $n_0$.

3) The transfer function H(w) is time varying in which both the attenuation $h_0$ and the delay $n_0$ may change over time, because echo cancellation is used in a variety of situations. For example, the echo path may change (i) from call to call; (ii) in a multiple extension environment; (iii) a bridge during the call. However, cases (ii) and (iii) are much less frequent than case (i). It is reasonable to assume in most cases that $h_0$ and $n_0$ change more slowly throughout the call. Therefore, from its input and output signals a reliable set of parameters for H(w) can be adaptively determined over short intervals (typically 20~60 ms) during which time-invariance is assumed.

4) Since a weak signal is more likely to be corrupted by ambient noise, for a more reliable measure, the transfer function H(w) should not be estimated during a silent period or in a double-talk interval.

From the above assumptions, the corresponding double-talk algorithms, on a frame-by-frame basis with a frame length of M (typically 256~512) and shifting step S (typically M/3, adjacent frames overlap by M−S=2M/3 samples), can be stated in the following steps:

I. For the n-th frame, the cross-correlation vectors Rxy(k), the peak cross-correlation value $\Phi_{xy}(n)$, the signal energies Ex(n), Ey(n) and the normalized cross-correlation coefficients Cxy(n) are first calculated from the corresponding $x_n(i)$ and $y_n(i)$ signals.

Then, Cxy(n) is further smoothed with the previous values by (approximately square ramp weighting scheme)

$$Cxy(n) = \left[\sum_{r=1}^{3} r^2 * Cxy(n-3+r)\right] / \sum_{r=1}^{3} r^2 \qquad (7)$$

$$= \frac{1}{14}[Cxy(n-2) + 4*Cxy(n-1) + 9*Cxy(n)]$$

$$\approx 0.10 * Cxy(n-2) + 0.30 * Cxy(n-1) + 0.60 * Cxy(n)$$

II. Based on the frame energy sequence Ex(n), Ey(n), a voice activity detector (VAD) 122, 124 s used for differentiating both $x_n$ and $y_n$ signals from ambient noise:

$$VAD(x_n) = \begin{cases} 0 & (\text{if } x_n \text{ is noise}) \\ 1 & (\text{if } x_n \text{ is signal}) \end{cases} \qquad (8a)$$

$$VAD(y_n) = \begin{cases} 0 & (\text{if } y_n \text{ is noise}) \\ 1 & (\text{if } y_n \text{ is signal}) \end{cases} \qquad (8b)$$

III. The Geigel thresholds $Th_0(n)$ are estimated from the Ex(n), Ey(n), $\Phi_{xy}(n)$ and Cxy(n), using an adaptive echo path tracking algorithm (which will be described in more detail). During the echo path tracking, if the Geigel algorithm is finished, the set MarkGeigel=1, otherwise MarkGeigel=0.

IV. If MarkGeigel=1 or $VAD(x_n)+VAD(y_n)=0$, then let g=0 and go to step (V). Otherwise, detect double-talk with the Geigel algorithm (the frame-based Geigel algorithm) based on the above $Th_0(n)$, $VAD(x_n)$ and $VAD(y_n)$ as follow:

If at least P ($3 \leq P \leq M/16$, typically P=M/32) samples in current frame $y_n$ satisfy one of the following conditions (note that they are mutually exclusive), (i) $VAD(y_n) = 1$, (9a)

and $|y_n(k)| \geq Th_0(n) * \max_{k-M \leq i \leq k} |x_n(i)|$, K = 1, 2, ... M.

(ii) $VAD(y_n) = 0$, (9b)

but $VAD(x_n) = 1$ and $|y_n(k)| \geq 2 * Th_0(n) * \max_{k-M \leq i \leq k} |x_n(i)|$.

then declare double-talk and set g=1. Otherwise declare no double-talk and let g=0.

V. Let current double-talk result $DTD(y_n)=g$.

VI. Modify the double-talk detection results based on the $VAD(y_n)$, the smoothed Cxy(n) and the current threshold $C_0(n)$:

$$DTD(y_n) = \begin{cases} , & \text{if } Cxy(n) \geq \max[C_{mid}, C_0(n) - \varepsilon_0] \\ VAD(y_n), & \text{if } Cxy(n) \leq \max[C_{min}, C_0(n) - \varepsilon_1] \\ g & \\ , & \text{other cases} \end{cases} \qquad (10)$$

VII. Modify the decision threshold $C_0(n)$ as follows:

If $Cxy(n) \geq \max[C_{mid}, C_0(n) - \varepsilon_0]$, (11)

then $C_0(n+1) = \min[C_{max}, 0.25 * C_0(n) + 0.75 * C_{xy}(n)]$, (Fast attack)

else $C_0(n+1) = \max[C_{mid}, (1-1/32) * C_0(n)]$. (Slow release)] (12)

Where $0 < C_{min} \leq C_{mid} \leq C_{max} < 1$, $0 < \epsilon_0 \leq \epsilon_1 < 1$ and $C_{mid} \sim C_{max}$ is the adaptation range. Typically, $C_{min}=0.10$, $C_{mid}=0.40$, $C_{max}=0.90$, $\epsilon_0=0.10$, $\epsilon_1=0.35$, $C_0(1)=C_{mid}$.

Note that the following case which is known as the "gray area" of the CORR-algorithm, will maintain the results $DTD(y_n)=g$ of the Geigel algorithm unchanged, $$\max[C_{min}, C_0(n)-\epsilon_1] < Cxy(n) < \max[C_{mid}, C_0(n)-\epsilon_1] \qquad (13)$$

VIII. Hangover addition:

Modify double-talk counter $N_d$ by (initial $N_d=0$, $N_{hang}$ is the additional hangover frames, $N_{hang}=1\sim2$), $$N_d = \begin{cases} \max[0, N_d - 1], & \text{if } DTD(y_n) = 0 \\ \min[N_{hang} + 1, N_d + 1], & \text{if } DTD(y_n) = 1 \end{cases}. \qquad (14)$$

IX. The above frame-based double-talk algorithm has an algorithmic delay Ta, which is equivalent to the interval of S samples (see FIG. 2). If the delay is tolerable (e.g., a frame-based speech codec) then set the total delay in the Sin-path to (Ta+Tp) and return $DTD(y_n)$ as the final double-talk result for the latest S samples in $y_n$.

Otherwise, set Tp as the total delay in the Sin-path, go to step (X) once a new sample $y_{n+1}$ is received, and further run the sample-based Geigel algorithm for the algorithmic delay compensation. Tp is the processing delay of the double-talk detector 140.

X. The following sample-based Geigel algorithm will be triggered if a new sample of $y_{n+1}$ is received:

Assuming that the t-th sample of the (n+1)-th frame, $s_t=y_{n+1}(M-S+t)=y_n(M+t)$, is currently the newest Sin data, which has been stored in the Sin-Buffer.

The Geigel threshold for $s_t$ is calculated with the currently available frame-based results as $$Th_g(t) = \begin{cases} Th_0(n-1), & \text{if } Th_0(n) \text{ is not ready} \\ Th_0(n), & \text{if } Th_0(n) \text{ is ready} \end{cases}. \qquad (15)$$

$$\text{If } |s_t| \geq Th_g(t) * \max_{t-M \leq i \leq t} |x_{n+1}(M-S+i)| \text{ and } |s_t| \geq 2.50 * \sigma_y(n), \text{ then} \quad (16)$$
$$GeigelCount = \min(GeigelCount + Ps, S*N_{hang} + .1);$$

Otherwise, GeigelCount=max(GeigelCount−1,0). Here, $2.50*\sigma_y(n)$ is the noise levels estimated by the voice activation detector 122, 124, $N_{hang}$ is the additional hangover frames, and Ps=M/32 is the hangover increment step.

If GeigelCount>0, or the previous frame-based double-talk result DTD($y_n$)>0, then set DTD($s_t$)=1, declare double-talk for the current input sample $s_t$ (the adaptive filter should also be prohibited without any algorithmic delay) and then return.

Otherwise, set DTD($s_t$)=0 and return (wait for the next input sample $s_t$+1).

Note that DTD($y_n$) is used to denote the double-talk result for the n-th frame, while DTD($s_t$) is used to denote the double-talk result only for the t-th sample in the (n+1)-th frame. For simplicity and to avoid confusion, the frame-based result DTD($y_n$) is also denoted as DTD(n), and the sample-based result DTD($s_t$) is denoted as DTD(t).

Since during a silent or very noisy interval, the double-talk detection and the echo path estimation are not reliable, the following simplified voice activity detection algorithm is adopted by voice activity detectors 122, 124 to differentiate signal from noise. The VAD algorithm is similar to those used in a standardized coder (see ITU-T G.723.1 Annex A, or ITU-T G.729 Annex B) except that the final decision is based on sample amplitude rather than the frame energy.

For the n-th frame $x_n$, the noise level Ax(n) is first estimated based on its previous value Ax(n−1) and the current frame energy Ex(n). Then an adaptive threshold $Th_x$ is calculated for the VAD decision. That is, If Ex(n)≥Ax(n−1) then Ax(n) is increased with some leakage and some upper bound $A_{xmax}$ by $$Ax(n) = \min\left[\left(1 + \frac{1}{32}\right)*Ax(n-1), A_{xmax}\right], \quad (17)$$

Else if Ex(n)≤Ax(n−1) then Ax(n) is modified with lower bound $A_{xmin}$ by $$Ax(n) = \max[0.5*Ax(n-1)+0.50*Ex(n), A_{xmin}] \quad (18)$$

If at least P(3≤P≤M/16, typically P=M/32) samples in current frame $x_n$(k) satisfy $|x_n(k)|>Th_x$, k=1,2, ..., M, then declare voice and set VAD($x_n$)=1.

Where $Th_x$ is calculated by $$Th_x = 2.50*\sigma_x(n), \sigma_x(n) = \sqrt{\frac{Ax(n)}{M}}. \quad (19)$$

Otherwise, VAD($x_n$)=0, and classify current frame $x_n$ as background noise.

Similarly, the VAD algorithm may also be used for the $y_n(i)$ sequence, i.e., $$\text{If } Ey(n) \geq Ay(n-1) \text{ then } Ay(n) = \min\left[\left(1 + \frac{1}{32}\right)*Ay(n-1), A_{ymax}\right], \quad (20)$$

$$\text{If } Ey(n) < Ay(n-1) \text{ then } Ay(n) = \quad (21)$$
$$\max[0.50*Ay(n-1)+0.50*Ey(n), A_{ymin}].$$

$$\text{Let } Th_y = 2.50*\sigma_y(n), \sigma(n)_y = \sqrt{\frac{Ay(n)}{M}}. \quad (22)$$

If at least P samples in the current frame $y_n(k)$ satisfy $|y_n(k)|>Th_y$, k=1,2, ..., M, then declare voice and set VAD($y_n$)=1. Otherwise, VAD($y_n$)=0.

Here, very similar to equation (14), both VAD($x_n$) and VAD($y_n$) are hung over 1~2 additional frame(s). For standard μ-Law decoded signals in the range −1.0~+1.0, the initial values for the VAD 122, 124 can be set as $X_{xmin}=A_{ymin}=M*10^{-5}$, $A_{xmax}=A_{ymax}=M*10^{-2}$, Ax(1)=0.10, Ay(1)=0.10, P=M/32, where Ex(n) and Ey(n) are calculated by equations (2) and (3). The bound values can be set as the adaptable ranges of VAD 122, 124, e.g., the minimum and maximum frame energy of the background noise.

For simplicity, the above focuses on how to track the attenuation (amplitude response $|h_0|$) of an echo path model (EPM) like equation (6), and how to take into consideration the noise effect for more precisely estimating the decision threshold for the Geigel algorithm (referred as the Geigel threshold).

From the above assumption, if near-end speech is not present, then $$y(k) \approx h_0 * x(k-n_0) + N(k), \quad (23)$$

where N(k) is the background noise in the send-in signal with auto-correlation function $R_N(n)$. By assuming $R_{xN}(k)=0$, the following cross-correlation and auto-correlation sequences can be calculated as $$Rxy(k) \approx h_0 \cdot Rx(k-n_0), \quad (24)$$

$$Ry(k) \approx |h_0|^2 \cdot Rx(k) + R_N(k). \quad (25)$$

Maximizing both sides of equation (24), and letting k=0 in equation (25), then from equation (6), $$|H(w)| = |h_0| \approx \frac{\max_k |Rxy(k)|}{Rx(0)}, \quad (26)$$

$$Ry(0) \approx |h_0|^2 \cdot Rx(0) + R_N(0) = Re(0) + R_N(0). \quad (27)$$

Replacing $|h_0|$ in equation (27) with equation (26), gives $$\frac{\left[\max_k |Rxy(k)|\right]^2}{Ry(0) \cdot Rx(0)} = 1 - \frac{R_N(0)}{R_y(0)}, \quad (28)$$

That is, $$C_{xy}(n) = \frac{\max_k R_{xy}^2(k)}{Ry(0)Rx(0)} = 1 - \frac{R_N(0)}{R_y(0)} = \frac{1}{1+(1/ENR)}. \quad (29)$$

Where $Re(0) = |h_0|^2 \cdot Rx(0)$ is the echo energy and $$ENR = \frac{Re(0)}{R_N(0)}$$

is the echo-to-noise energy ratio which is a measurement of the amount of noise energy.

The left side of equation (29) is actually the square normalized cross-correlation coefficients Cxy(n) defined in equation (5). It can also be seen from equation (27) that Cxy(n) is a function of both x(k) and N(k) even if $|H(w)| = |h_0|$ is constant. Usually, an echo path is not perfectly constant but is slowly (compared to the signal) time variant.

In order to track variations in the amount of background noise, the signal levels and the echo path attenuation, the adaptive decision threshold should be used for the above double-talk algorithm at steps IV and VI. Furthermore, the Geigel algorithm is based upon the relative power levels between x(k) and y(k), if y(k) has been corrupted by the background noise, then it is not sufficient to make reliable decisions based only on the attenuation $|h_0|$, the noise effects should also be reflected in the Geigel threshold.

It is first useful to consider the noise effect on the double-talk algorithm. From the right side of equation (29), if N(k) contains only very small background noise and no double-talking, then $$N(k) \approx 0, \quad R_N(0) \approx 0, \quad (30)$$

which results in $$Cxy(n) \approx 1, \quad (31)$$

$$\text{and } |Txy| = \sqrt{\frac{Ry(0)}{Rx(0)}} \approx |h_0|. \quad (32)$$

But if $N(k) \neq 0$ and only assuming $R_{xN}(k)=0$, then from the above definitions, $$|Txy| = \quad (33)$$

$$\sqrt{\frac{Ry(0)}{Rx(0)}} = \sqrt{|h_0|^2 + \frac{1}{ENR \cdot |h_0|^2}} = \sqrt{\left(1 + \frac{1}{ENR}\right)} \cdot |h_0| \geq |h_0|,$$

If the noise effects have to be taken into consideration, the ENR in equation (33) can be viewed as a noise compensation coefficient used to compensate the $|h_0|$ in equation (26) or equation (32). As shown in equation (33), $|Txy|=|h_0|$ only if $ENR \to \infty$, which means noise compensation is unnecessary. This case is shown in equation (32). However, such a condition is unlikely because the signal-to-noise ratio (SNR) in an A-law/$\mu$-law PCM compression is much less than 35 dB, which means that the ENR upper bound for the echo from a 6 dB hybrid should be $ENR \leq 29$ dB. An actual ENR value is usually much smaller than this theoretical limit. From equation (27), the noise energy has been included in the Ry(0), which is used for $|Txy|$ estimations. For more reliable results, the Geigel threshold should be estimated with $|Txy|$ rather than $|h_0|$, and the calculation should be performed only when the values of Cxy(n) is large which indicate a clear no double-talk situation. For the sake of sensitivity, the Geigel threshold should also be calculated only when the values of the ENR is also large which indicate N(k) contains only a suitable amount of noise signal (usually limit $ENR \geq 0.5 \sim 1.0$).

From the above, the Geigel threshold can be estimated with the following echo path tracking and noise compensation algorithms:
1) Let $$\Phi_{xy}(n) = \max_{0 \leq k \leq M-1} |R_{xy}(n, k)|$$

be the maximum $|R_{xy}(k)|$ value in the n-th frame, $$C_{xy}(n_{\max}) = \max_{r-r+1 \leq k \leq n} C_{xy}(k) \text{ and } C_{xy}(n_{\min}) = \min_{n-r+1 \leq k \leq n} C_{xy}(k)$$

be the maximum and minimum $C_{xy}$ values in the most recent r frames, where $n_{max}$ and $n_{min}$ are the corresponding frame index (note that $n-r+1 \leq n_{max} \leq n$, $n-r+1 \leq n_{min} \leq n$). An estimate of the amplitude response of the echo path is $$T_{xy} = \sqrt{\frac{E_y(n_{\max})}{E_x(n_{\max})}}, \quad (34)$$

2) If $C_{xy}(n_{min}) \geq \max[\beta_0, C_{xy}(n_{max}) - \epsilon_0] \geq C_{mid}$, $h_{mid} \leq T_{xy} \leq h_{max}$ and $VAD(x_n)=1$, then the track attenuation $h_0$ of the echo path with the calculated $T_{xy}$ as follow, $$h_0(n) = (1-\mu_0) \cdot h_0(n-1) + \mu_0 \cdot T_{xy}, \quad (35)$$

and set MarkGeigel=1, which means that double-talk with the frame-based Geigel algorithm would be unnecessary if $\beta_0 \geq C_{mid}$ and $C_{xy}(n_{max})$ is very close to $C_0(n)$, in other words, the frame-based Geigel algorithm has finished. The condition $H_{min} \leq T_{xy} \leq h_{max}$ is used for removing the outliners or the irregular updates in $h_0(n)$. Otherwise, $h_0$ remains unchanged, i.e., $$h_0(n) = h_0(n-1), \quad (36)$$

and Mark Geigel=0, which means that the Geigel algorithm has not finished in the current frame.
3) Since the echo path tracking results $h_0(n)$ reflect the relative power levels between x(k) and y(k) only in the average, for a more reliable result, the following modified $Th_0(n)$ can be used as the final Geigel threshold:

$$Th_0(n) = \min[h_{max}, \max(h_{min}, (1+\eta) * h_0(n))] \quad (37)$$

Here $0 \leq \eta \leq 0.25$ is a small positive used further for noise compensation in order to remove the irregular noise peaks. $0 < h_{min} \leq h_{max} \leq 1$ is the lower/upper bound value, $C_{mid} \leq \beta_0 \leq 1.0$, $0 \leq \mu_0 \leq 1.0$. Typically, $h_{min}=0.15$, $h_{max}=0.90$, $\mu_0 = C_{mid}$, $\epsilon_0=0.10$, $\mu_0=0.75$. The initial value may be $h_0(0)=0.50$.

(A) Fast Implementations of the Geigel Algorithm The Geigel algorithm is used for both the frame-based and sample-based double-talk detection. Since the algorithm searches the peak value in a sliding window of $x_n(i)$ (see equations 9a and 9b), it is preferred to run the sorting procedure in descending order of $|x_n(i)|$ and then keep updating at each sample iteration. In I. Pitas, "Fast algorithms for running ordering and max/min calculation," IEEE Trans. Circuits Syst., Vol. 36, pp. 795–804, June 1989, a fast algorithm is proposed for sorting and max/min calculations in a sliding window of arbitrary M elements (M is usually a power of 2), which requires, at most, $2 \log_2(2M)$ comparison operations per sample time. This is also the complexity of the sample-based Geigel algorithm. However, the total intermediate storage needed is about $(M + \log_2 M)$ units.

Consequently, for M samples of $y_n(i)$, complexity of the frame-based Geigel algorithm is, at most, on an order of $O(2M \log_2 2M)$ operations and $O(M)$ storage.

Another approach to the fast max/min calculation, for arbitrary M elements, is the MAXLINE algorithm in I. Pitas, "Fast algorithms for running ordering and max/min calculation," IEEE Trans. Circuits Syst., Vol. 36, pp. 795–804, June 1989, which requires, on average, only 3 comparisons per sample time for uniformly distributed input. This is also the complexity of the sample-based Geigel algorithm. Since no intermediate storage is needed in this algorithm, and the worst case, which requires (M+1) comparisons per sample time, is quite rare for sufficiently large window lengths M, therefore, the MAXLINE is a very good tradeoff between speed and cost. The complexity of the frame-based Geigel algorithm based on MAXLINE is $O(3M)$ in the average and $O(M^2)$ in the worst (but very rare) case.

(B) Delay and Complexity Considerations in the Frame-based Algorithms

Since the proposed double-talk algorithm of the present invention may be based on a frame-by-frame basis with a frame shifting step of S, an algorithmic delay Ta of at least S samples is required for initiating the double-talk calculations (all the received data are assumed to be zero at the beginning). For more reliable results, the final decisions are usually based on results of several frames. If the most recent r frames are tested, the total delay should be Td=r*S samples (or r steps) where r is usually 1~3. It should be noted that the calculation/processing delay Tp is usually less than S samples, because processing on the current frame is performed in parallel while receiving the inputs of the next frame. The algorithmic delay can be reduced with a smaller S or r, but the computational load may be increased when decreasing the step S, and, the reliability may also be degraded if decreasing r.

In addition to the algorithmic delay, the flat delay (or pure delay Tr) of the echo path must also be taken into consideration. That is, for more reliable parameter estimation, the frame length M should be able to cover the longest echo path delay that needs to be accommodated. But if M is too large, it will not adequately reflect the changing properties of the echo path or the speech signal. The computational load and memory cost will also increase if M increased. For an 8 kHz sampling rate system, M is typically 256~512, which corresponding to a delay of 32~64 mS, and S is typically selected as M/3 (an algorithmic delay Ta of about 20 ms).

The complexity of the frame-based algorithm must also be considered. For every step of S samples, the cross-correlation function Rxy(n,k) must be calculated, which requires $O(2M \log_2 2M)$ operations via fast correlation with FFT, and requires about 4M memory units for buffering the I/0 data. The calculations of Cxy(n) must search the peak value of Rxy(n,k) and calculate the two energies Ex(n) and Ey(n), which will require about $O(3M)$ operations, and require 4*r memory units for recording these results in the most recent r frames. In FIG. 2, delays 180 are introduced to compensate for the algorithmic and processing delay before the input data is sent to the adaptive filter NLMS 120. Delays 180 are actually done by buffering the data in the Rout-Buffer 108 and Sin-Buffer 110 (see the dash lines 124, 126 to the NLMS 120 in FIG. 2), which may share the same memory space with the Xn Buffer 112 and Yn Buffer 114. Therefore, only 2*S extra units are required to buffer inputs for the next frame.

In addition to the frame-based Geigel algorithm, which require, at most, an order to $O(2M \lg o_2 2M)$ operations and (M+log$_2$M+r) memory units for sorting or I/O buffering, the total computations and memory complexity is on the order of $O(4M \log_2 2M+3M) \approx O(4M \log_2 4M)$ operations for each frame and $O(5(M+r)+\log_2 M+2S) \approx O(7M)$ memory units, respectively. If both $x_n$ and $y_n$ are silent frames, there is no need to perform most of the computations.

(C) Auxiliary Double-talk Detection for Implementing the Sample-based Geigel Algorithm In FIG. 2, extra delays (or buffers) 180 are introduced to compensate for both the algorithmic delay Ta and the DTD(n) processing delay Tp before the input data is sent to the adaptive filter NLMS 120. The algorithmic delay Ta is due to the frame-based algorithms and is usually much greater than Tp. In order to remove the Ta in the Sin path, the sample-based Geigel algorithm may be used for double-talk detection for the latest S input in $y_{n+1}$. If Tp is greater than one sampling interval (0.125 mS for 8 kHz sampling rate), then the sample-based algorithm can be implemented as an interrupt service procedure (ISP) which is triggered by each new input data in $y_{n+1}$ (see step (IX)~(X) above).

Figure 4:
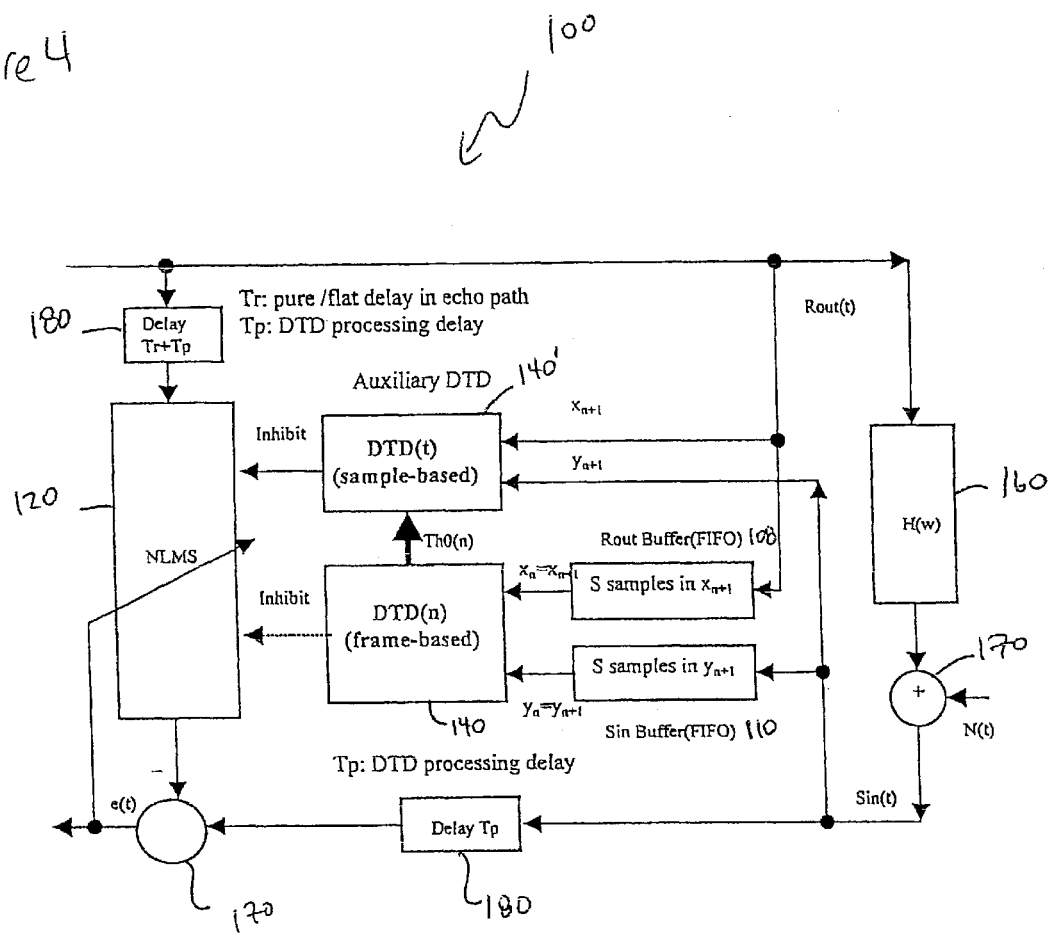
FIG. 4 illustrates an echo canceller in another exemplary embodiment of the present invention.

Since both the frame-based and the sample-based algorithm may be run at the same time during the DTD(n) processing intervals Tp, another, faster scheme is to use an auxiliary double-talk detector 140' implementing the sample-based Geigel-algorithm in parallel (as illustrated in FIG. 4). In this case, the frame-based double-talk detector 140 serves mainly as the Geigel threshold estimator which updates the Th$_0$(n) and then transfer them to the auxiliary double-talk detector 140' on a frame-by-frame basis, and the results from double-talk detector 140' are used to control the adaptive filter 120. The results from double-talk detector 140 can also be used as a supplementary parameter for the final decisions in order to improve the reliability (e.g., using a state machine). Although the results in the n-th frame Th$_0$(n) are used, the decision threshold may also be used for samples in the (n+1)-th frame, since it is reasonable to assume in most cases that, echo path change is not significant in such a short interval and the Geigel threshold remains approximately the same in two adjacent frames.

Figure 3:
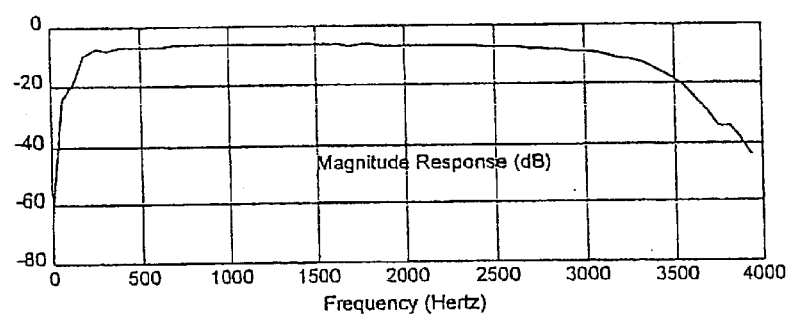
FIGS. 3(a) and 3(b) illustrate the amplitude response and phase response of an exemplary hybrid, in one embodiment of the present invention.
Figure 3:
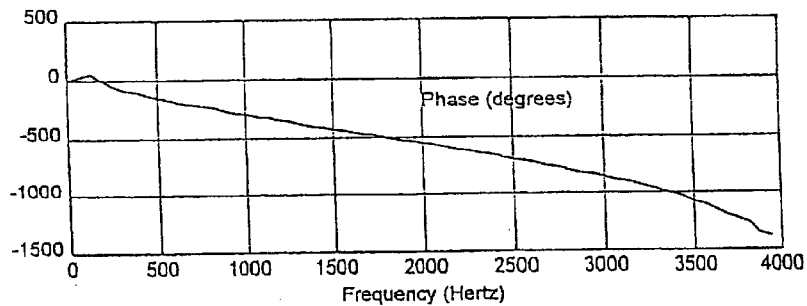

The 6 dB hybrid illustrated in FIG. 3 is used as the simulated echo path H(w) for the following performance simulations. The peak and the average attenuation value of H(w) in the voice band (f=300 Hz~3400 Hz or W=2πf=600~6800π, where W is the radian frequency in radians/second) are, $$h_{0max} = \max_{600\pi \leq w \leq 6800\pi} |H(w)| = 0.498, \quad (38a)$$

$$h_{0mean} = \max_{600\pi \leq w \leq 6800\pi} |H(w)| = 0.444, \quad (38b)$$

which show a quite flat amplitude response in the voice band. As a result, Hr=h$_{0\ max}$≈0.50 as a reference basis for echo path tracking. The echo path changes will be simulated by multiplying H(w) with a time varying scale factor q(t), and the new reference will be changed to q(t)*Hr as well, i.e., $$H(w,t)=q(t)*H(w), \quad (39a)$$

$$Hr(t)=q(t)*Hr. \quad (39b)$$

For the simulations, all parameters are set to the suggested typical values, i.e., the frame length M=512, shifting step S=M/3≈170, $h_{min}$=0.15, $h_{max}$=0.90, η=0.20, $C_{min}$=0.010, $C_{mid}$=0.40, $C_{max}$=0.90, $\epsilon_0$=0.10, $\epsilon_1$=0.35, $\beta_0$=$C_{mid}$, $\mu_0$=0.75. Sample counters for both the VAD 122, 124 and the Geigel algorithm are P=Ps=M/32. Both the double-talk detector 140 and the VAD 122, 124 hang over two additional frames ($N_{hang}=2$), and a trace back of two frames (r=3) is used. For standard μ-law PCM decoded signals x(t) and y(t), the amplitude is always less than 1.0, so the bound values for the VAD 122, 124 are selected as $A_{x\ min}=A_{y\ min}=M*10^{-5}$, $A_{x\ max}=A_{y\ max}=M*10^{-2}$.

Figure 5:
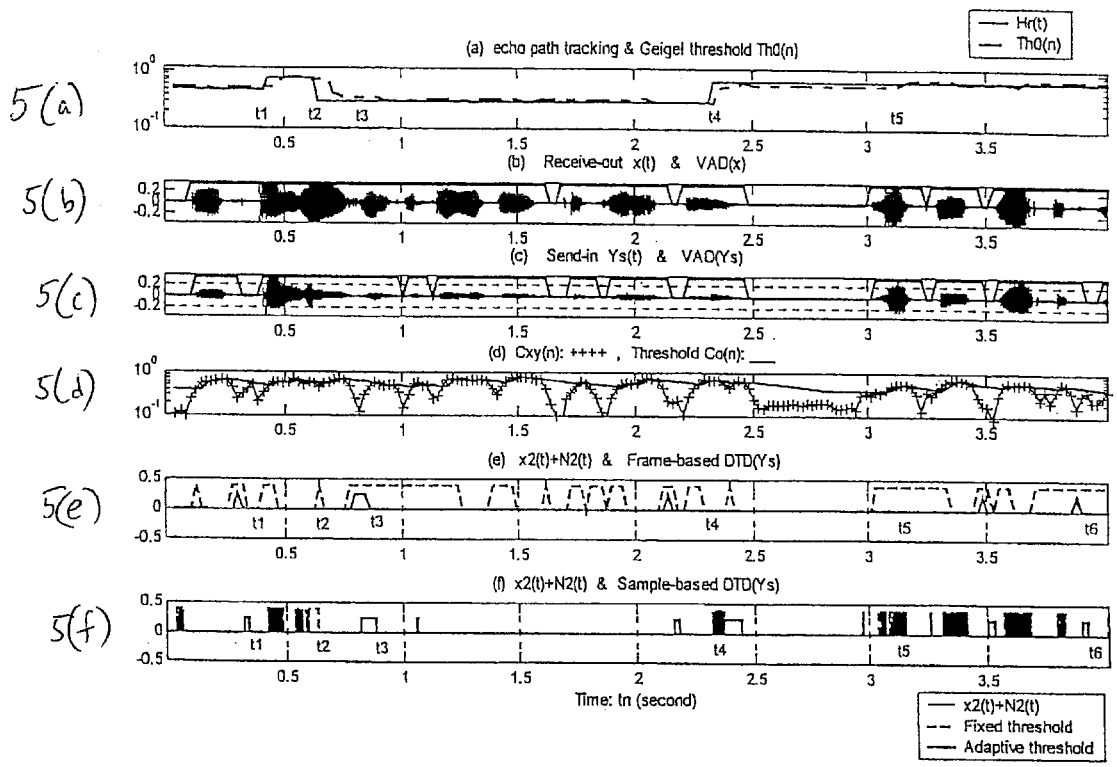
FIGS. 5(a)–5(f) and 6(a)–6(f) illustrate simulation results for the exemplary echo canceller embodiments of FIGS. 1 and 2.
Figure 6:
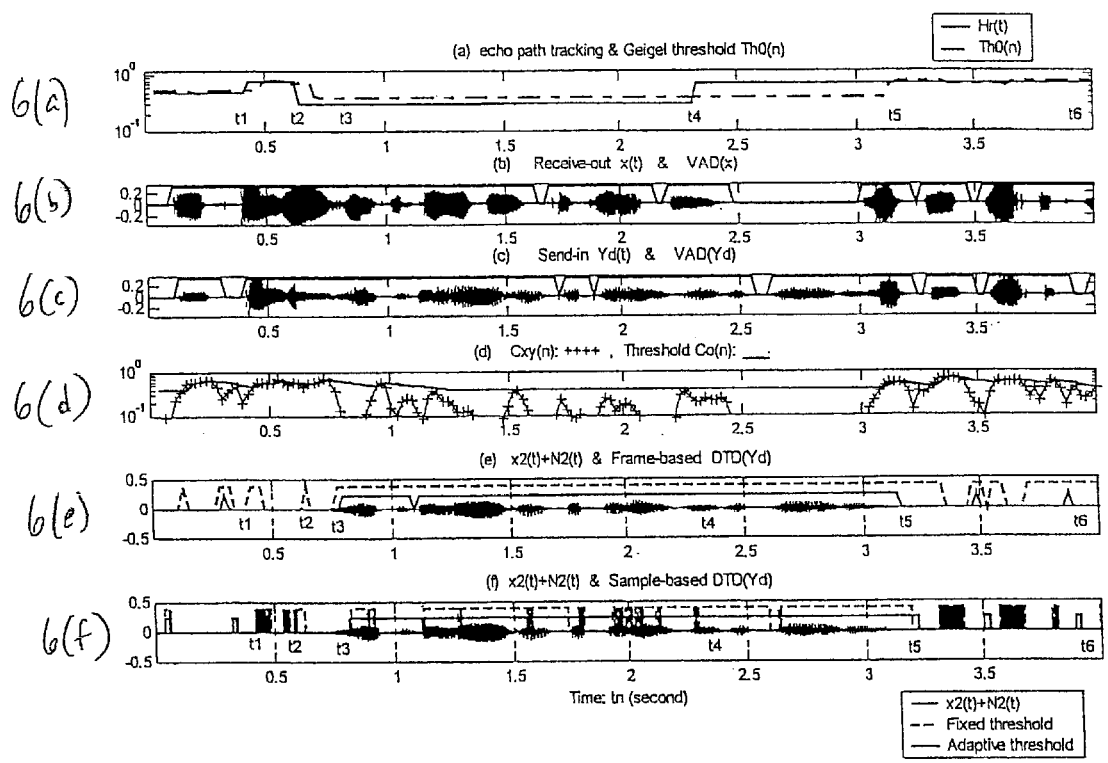

FIGS. 5–6 are simulation results when two parties speak in environments with echo path changes. FIG. 5 shows a no double-talk situation while FIG. 6 shows double-talk situations. Hr(t) is reference of the actual echo path which changes suddenly at $t_1=0.40$ (q(t) changes from 1.0 to 1.60, or Hr(t) from 0.50 to 0.80), $t_2=-0.60$ (Hr(t) from 0.80 to 0.30) and $t_4=2.30$ (Hr(t) from 0.30 to 0.70). The adaptive Geigel threshold Th0(n), which reflect the echo path tracking results, is plotted together with the reference Hr(t).

If x1(t) and x2(t) are the original speech of the two parties decoded from 8-bit standard μ-law PCM), N1(t) and N2(t) are the corresponding additive background noise that are simulated by $$N1(t)\ NR1(t)*\text{Randn}(0,1), \quad (40a)$$

$$N2(t)=NR2(t)*\text{Randn}(0,1). \quad (40b)$$

Randn(0,1) is Gaussian noise with zero mean and unit variance. The following NR1(t) and NR2(t) are used to control the noise levels.

$$NR(t)=0.0012, \quad (41a)$$

$$NR2(t)=0.0015. \quad (41b)$$

The near-side x(t) and far-side y(t) signals are simulated as (h(t) is the impulse response of H(w,t), $\otimes$ a is convolution operator, $t_{fd}=12$ mS is the additional flat delay), $$x(t)=x1(t)+N1(t), \quad (42a)$$

$$y_s(t)=h(t)\otimes x(t-t_{fd})+N2(t), \text{ (no double-talk, see FIG. 5}(c)) \quad (42b)$$

$$y_d(t)=h(t)\otimes x(t-t_{fd})+N2(t)+x3(t). \text{ (double-talk, see FIG. 6}(c)) \quad (42c)$$

Note that when there is no double-talk, the Ys(t) contains only echoes and noise (see FIG. 5(c)). But in FIG. 6(e)~(f), the near-end speech x2(t) is present at the intervals from $t_3=0.75$ to $t_5=3.25$ (in seconds), therefore the Yd(t) contains echoes and noise plus the near-end speech (see FIG. 6(c)). The relative level between echo/noise and speech signal can be seen from the figures.

For comparison purposes, the double talk detection results of the new frame-based double-talk detection-algorithm (with adaptive thresholding) are plotted together with the CORR-algorithm with fixed threshold of 0.50, while results of the new sample-based Geigel-algorithm (also with adaptive threshold) are plotted together with the conventional Geigel-algorithm (with fixed threshold of 0.50), and the original NES plus noise x2(t)+N2(t) are plotted in the figures as the references. See (e)~(f) in the two figures, where double-talk detection>0 means double-talk is detected and double-talk detection=0 means no double-talk has been detected.

The VAD results, the Cxy(n) and its threshold value C0(n) are also plotted on the figures.

It can be seen from FIGS. 5(a)–5(f) and 6(a)–6(f) that,

From FIGS. 5(a) and 6(a), the Geigel threshold Th0(n) is capable of continuously tracking changes in both the echo path and the noise levels during the intervals with only the far-end speech present.

Tracking changes of the echo path is quite fast and non-intrusive. If an echo path change occurs with only the far-end speech present, the tracking delay is typically less than 3~4 steps when r=1~3, which is about 60~80 mS when M=512 and S=M/3. Actually, the tracking delay is only 1~2 steps or 40 mS in most of the performance simulations. The silence or the double-talk interval usually causes very long tracking delay, since the estimate is updated only when a good situation occurs, i.e., no double-talk, no silence, and when Cxy(n) is high. As a result, the echo path change occurs during silence or double-talk intervals would not be detected (see FIG. 6(a)). This is no problem for a silent period. This should also not be a problem for the double-talk case, since double-talk should have higher priority and adaptation should be inhibited.

The simplified VAD algorithm is quite effective and sufficient for the purpose of double-talk detection (as shown in FIGS. 5(b)–5(c) and 6(b)–6(c)).

Except for some endpoints of the speech segments, the peak values of Cxy(n) can be tracked continuously and smoothly by the threshold C0(n). Note that the threshold C0(n) is variable and may range from Cmid=0.40 to Cmax=0.90, which indicates that an adaptable threshold is more advantageous than a fixed threshold. This can be seen from the frame-based double-talk detection results shown in FIGS. 5(e) and 6(e). Actually, while keeping the same probability (frequency) of a miss, i.e., a double-talk interval is not detected, the probability of false alarms, i.e., double-talk is erroneously decided, is very high when fixed threshold (C0(n)=0.50) is used. Obviously, a lower fixed threshold (e.g., C0(n)=0.40) could decrease the false alarms in this case but will also increase the miss probability.

Except for the transient state (typically less than 3~4 steps) of the echo path tracking, the proposed sample-based DTD(n) is quite robust to the above sudden changes in the echo path. With the adaptive threshold, it is also more robust to the echo levels, so, there is no need for the attenuation of the echo path to be at least 6 dB. Actually, as shown in (f) of FIGS. 5–6, the conventional Geigel algorithm with fixed threshold of 0.50 make many false alarms at the intervals t1~t2 and t5~t6 when the attenuation of the echo path is less than 6 dB. This conventional Geigel algorithm also has many misses at the intervals t3~t5 when the attenuation of the echo path is greater than 6 dB. These detection errors can be considerably reduced with the new algorithms described above.

Figure 7:
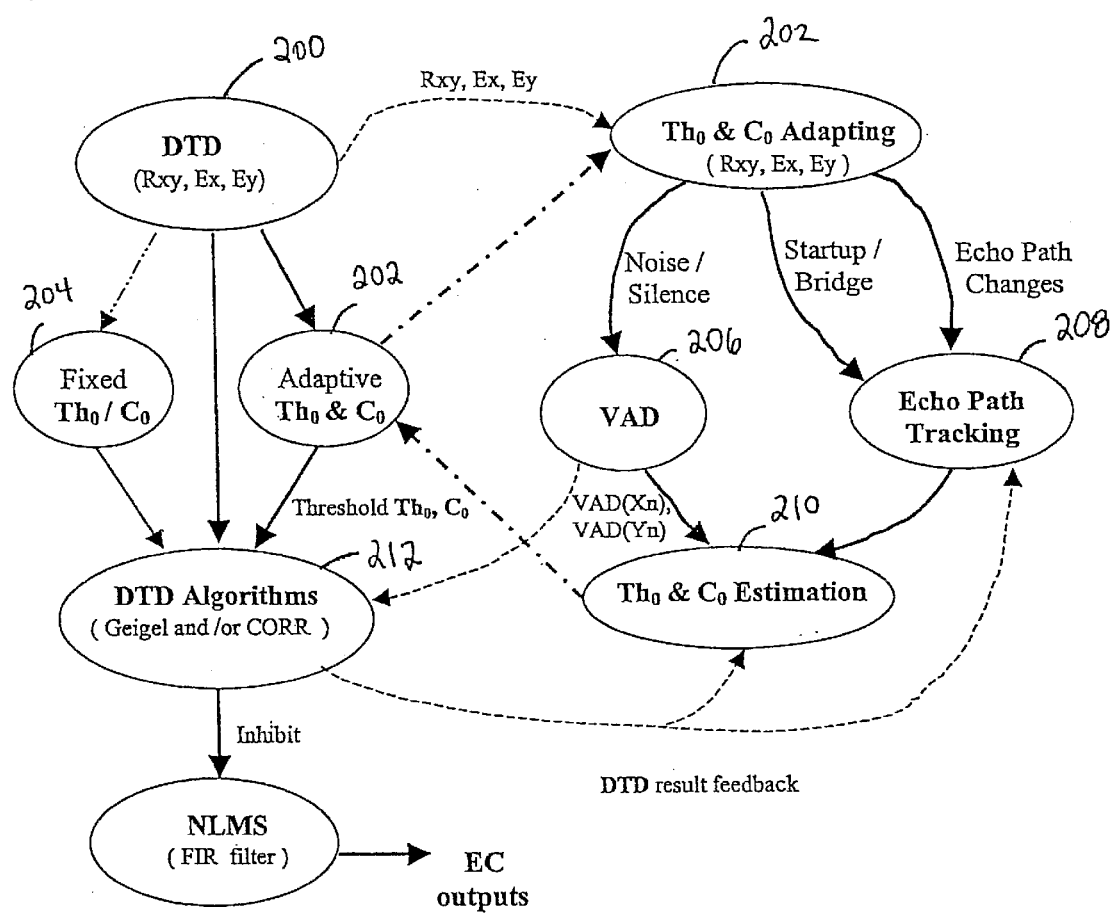
FIG. 7 is a block diagram summarizing the processing performed by the echo canceller and double-talk detector of the present invention.

FIG. 7 illustrates the main components of the present invention and their interrelation to each other. Double-talk detector (DTD) 200 provides parameters Rxy, Exy, and Ey to an adaptive thresholder 202, (the DTD 200 may also supply parameters Rxy, Exy, and Ey to a fixed thresholder 204, as done in the conventional echo canceller). The thresholder 202 determines a noise/silence condition, which is forwarded to a voice activity detector 206. The adaptive thresholder 202 also determines a start up/bridge condition and/or echo path changes, each of which are provided to an echo path tracker 208. The outputs of both the VAD 206 and the echo path tracker 208 are input to a thresholder estimator 210 which estimates the value of the adaptive threshold. Elements 202, 206, 208, and 210 form a loop to update threshold parameters $Th_0$ and/or $C_0$. The updated threshold $Th_0$ and $C_0$ are then provided to the double-talk detection algorithm 212, which may be a Geigel algorithm and/or a correlation algorithm. The output of the double-talk detector algorithm 212 determines whether the NLMS filter is inhibited or not. Previous detections of near-end speech by the double-talk detection algorithm 212 are fed back to the threshold estimator 210 and the echo path tracker 208 as a feed back loop.

Since weak signals are more likely to be corrupted by ambient noise, for increased reliability, the echo path should not be estimated during a silence or a double-talk interval. Echo path usually changes suddenly during start up or call bridging. Inclusion of the Geigel algorithm or a correlation algorithm includes a trade off between reliability and delay (or complexity). One effective implementation is to combine the Geigel algorithm with a correlation algorithm. Further, in a preferred implementation, the adaptive thresholding is performed only when favorable conditions occur. For example, when there is no double-talk, no silence, and/or when value Cxy in the cross-correlation is high.

It is further noted that the inventive echo canceller and inventive double-talk detector have been described (in detail with respect to FIGS. 2–6 and generally with respect to FIG. 7) with resident functionality. However, the functionality described above in detail with respect to FIGS. 2–6 and in general with respect to FIG. 7, could also be loaded into a conventional echo canceller or double-talk detector, via an article of manufacture or a propagated signal.

In summary, a new echo canceller and double-talk detector with adaptive decision thresholding has been described above. Simulation results show the effectiveness of the new double-talk detection and the related echo path tracking algorithm. Compared to the existing non-adaptive method, detection errors are considerably reduced especially when the echo path changes occur. When operating in a sample-by-sample mode, the new double-talk detection can be used with a network echo canceller (EC) to quickly sense the near-end speech without algorithmic delay, or, it can also be used as a powerful device for echo path change detection. Since both double-talk and echo-path changes will cause a sudden increase in the power of error signals, if double-talk can be quickly and more precisely detected, then from the error signals, the echo path changes can also be detected more accurately. The new double-talk detection and its corresponding echo canceller can also be integrated into a frame-based speech codec and operate in a frame-by-frame mode to give more reliable detection results.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A double-talk detector for detecting near-end speech and inhibiting an adaptive filter when near-end speech is present, said double-talk detector comprising:

at least one threshold determining processing element for determining at least one adaptive threshold, and at least two double-talk detection processing elements working in combination for receiving at least one parameter and the at least one adaptive threshold and detecting the near-end speech;

wherein one of said at least two double-talk detection processing elements detects the near-end speech using a power ratio and one of said at least two double-talk detection processing elements detects the near-end speech using a correlation algorithm, the power ratio being a Geigel algorithm calculation.

2. The double-talk detector of claim 1, wherein said at least one parameter includes a signal energy.

3. The double-talk detector of claim 1, wherein the at least one parameter include a cross-correlation.

4. The double-talk detector of claim 1 wherein said at least one double-talk detection processing element is frame-based.

5. The double-talk detector of claim 1, wherein one of said at least two double-talk detection processing elements is frame-based.

6. The double-talk detector of claim 1, wherein one of said at least two double-talk detection processing elements is sample-based.

7. The double-talk detector of claim 1, wherein one of at least two double-talk detection processing elements is frame- and sample-based.

8. The double-talk detector of claim 1, said at least one threshold determining processing element including, a voice activity detector for detecting voice activity, and a threshold estimator for receiving the voice activity and estimating the at least one adaptive threshold.

9. The double-talk detector of claim 1 said at least one threshold determining processing element including, an echo path tracker for tracking the echo path, and a threshold estimator for receiving the echo path and estimating the at least one adaptive threshold.

10. The double-talk detector of claim 1, said at least one threshold determining processing element including, a voice activity detector for detecting voice activity, an echo path tracker for tracking the echo path, and a threshold estimator for receiving the voice activity and the echo path and estimating the at least one adaptive threshold.

11. The double-talk detector of claim 9, wherein a previous detection of near-end speech by said double-talk detector is fed back as an input to said echo path tracker and to said threshold estimator.

12. The double-talk detector of claim 10, wherein a previous detection of near-end speech by said double-talk detector is fed back as an input to said echo path tracker and to said threshold estimator.

13. An echo canceller including the double-talk detector of claim 1.

14. The echo canceller of claim 13, further comprising an adaptive filter for estimating an echo path and synthesizing an estimated echo signal.

15. The echo canceller of claim 13, wherein the adaptive filter is an adaptive FIR filter.

16. A method for detecting near-end speech and inhibiting an adaptive filter when near-end speech is present, comprising:

determining at least one adaptive threshold;

receiving at least one parameter and the at least one adaptive threshold; and detecting the near-end speech using a power ratio and a correlation algorithm in combination, the power ratio being a Geigel algorithm calculation.

17. The method of claim 16, wherein the at least one parameter includes a signal energy.

18. The method of claim 16, wherein the at least one parameter include a cross-correlation.

19. The method of claim 16, wherein the at least one parameter include a signal energy and a cross-correlation.

20. The method of claim 16, wherein the double-talk detection is frame-based.

21. The method of claim 16, wherein the double-talk detection is frame-based.

22. The method of claim 16, wherein the double-talk detection is frame- and sample-based.

23. The method of claim 16, said detecting step further including, detecting voice activity, and
 receiving the voice activity and estimating the at least one adaptive threshold.

24. The method of claim 16, said detecting step further including,
 tracking the echo path, and
 receiving the echo path and estimating the at least one adaptive threshold.

25. The method of claim 16, said detecting step further including,
 detecting voice activity,
 tracking the echo path, and
 receiving the voice activity and the echo path and estimating the at least one adaptive threshold.

26. The method of claim 24, wherein a previous detection of near-end speech by said method is fed back as an input to said echo path tracking step and to said threshold estimating step.

27. The method of claim 25, wherein a previous detection of near-end speech by said method is fed back as an input to said echo path tracking step and to said threshold estimating step.

28. A method of echo cancellation, including the method of claim 16.

29. The method of echo cancellation of claim 28, further comprising estimating an echo path and synthesizing an estimated echo signal.

30. A computer program, embodied in a computer-readable medium, for detecting near-end speech and inhibiting an adaptive filter when near-end speech is present, said computer program comprising:
 at least one threshold determining processing segment for determining at least one adaptive threshold, and
 at least one double-talk detection processing segment for receiving at least one parameter and the at least one adaptive threshold and detecting the near-end speech using a power ratio and a correlation algorithm in combination, the power ratio being a Geigel algorithm calculation.

31. A computer data signal comprising:
 at least one threshold determining processing segment for determining at least one adaptive threshold, and
 at least one double-talk detection processing segment for receiving at least one parameter and the at least one adaptive threshold and detecting the near-end speech using a power ratio and a correlation algorithm in combination, the power ratio being a Geigel algorithm calculation.

32. The computer data signal of claim 31, wherein said computer data signal is embodied in a carrier wave.

* * * * *